US008191821B2

(12) United States Patent
Knight

(10) Patent No.: US 8,191,821 B2
(45) Date of Patent: Jun. 5, 2012

(54) ACTUATOR

(75) Inventor: Matthew John Knight, Bristol (GB)

(73) Assignee: Airbus Operations Limited, Bristol (GB)

( * ) Notice: Subject to any disclaimer, the term of this patent is extended or adjusted under 35 U.S.C. 154(b) by 604 days.

(21) Appl. No.: 12/310,687

(22) PCT Filed: Sep. 11, 2007

(86) PCT No.: PCT/GB2007/050532
§ 371 (c)(1),
(2), (4) Date: Mar. 4, 2009

(87) PCT Pub. No.: WO2008/038037
PCT Pub. Date: Apr. 3, 2008

(65) Prior Publication Data
US 2010/0038478 A1    Feb. 18, 2010

(30) Foreign Application Priority Data
Sep. 25, 2006  (GB) .................................. 0618902.1

(51) Int. Cl.
*B64C 25/50* (2006.01)
(52) U.S. Cl. .......................... 244/51; 74/604; 244/75.1
(58) Field of Classification Search ................ 244/99.2, 244/75.1, 51, 100 R; 74/640
See application file for complete search history.

(56) References Cited

U.S. PATENT DOCUMENTS

| 3,006,215 | A | 10/1961 | Walton |
| 3,211,400 | A | 10/1965 | Booth |
| 3,214,999 | A | 11/1965 | Lapp |
| 3,709,059 | A | 1/1973 | Elsel |
| 4,154,425 | A | 5/1979 | Smith |
| 6,664,711 | B2 * | 12/2003 | Baudendistel ............ 310/323.02 |
| 7,178,427 | B2 * | 2/2007 | Christensen .................... 74/640 |
| 7,552,664 | B2 * | 6/2009 | Bulatowicz ...................... 74/640 |
| 7,721,625 | B2 * | 5/2010 | Saito ............................... 74/640 |
| 2005/0200328 | A1 | 9/2005 | Edson et al. |
| 2005/0229729 | A1 | 10/2005 | Zordan |
| 2005/0252316 | A1 | 11/2005 | Biester |
| 2006/0046889 | A1 | 3/2006 | Christensen |
| 2006/0283289 | A1 * | 12/2006 | Baudendistel et al. ......... 74/640 |

FOREIGN PATENT DOCUMENTS

| RU | 2 064 105 | 7/1996 |
| RU | 2 153 108 | 7/2000 |
| SU | 977 870 | 11/1982 |
| WO | WO 99/49238 | 9/1999 |
| WO | WO 03/102437 | 12/2003 |

OTHER PUBLICATIONS

International Search Report for PCT/GB2007/050532, mailed Nov. 23, 2007. Written Opinion of the International Searching Authority for PCT/GB2007/050532, mailed Nov. 23, 2007.
UK Search Report for GB Application No. 618902.1, dated May 25, 2007.
Database WPI, Accession No. 1997-144133, abstract.
English translation of Russian Office Action dated May 19, 2011 in RU 2009112491/11(016999).
English translation of cited portions of D.P. Volkov et al, "Harmonic Drives" Kiev: Tekhnika, 1976.

* cited by examiner

*Primary Examiner* — Galen Barefoot
(74) *Attorney, Agent, or Firm* — Nixon & Vanderhye P.C.

(57) ABSTRACT

An actuator comprising: two motors; an output member; and a harmonic gear comprising: an elliptical wave generator component; a flexible spline component which is coupled to the wave generator by a bearing and flexes to conform to the elliptical shape of the wave generator; and a circular spline component which surrounds and meshes with the flexible spline component. One of the harmonic gear components is coupled to the output member, and each of the other harmonic gear components is coupled to a respective one of the motors.

13 Claims, 5 Drawing Sheets

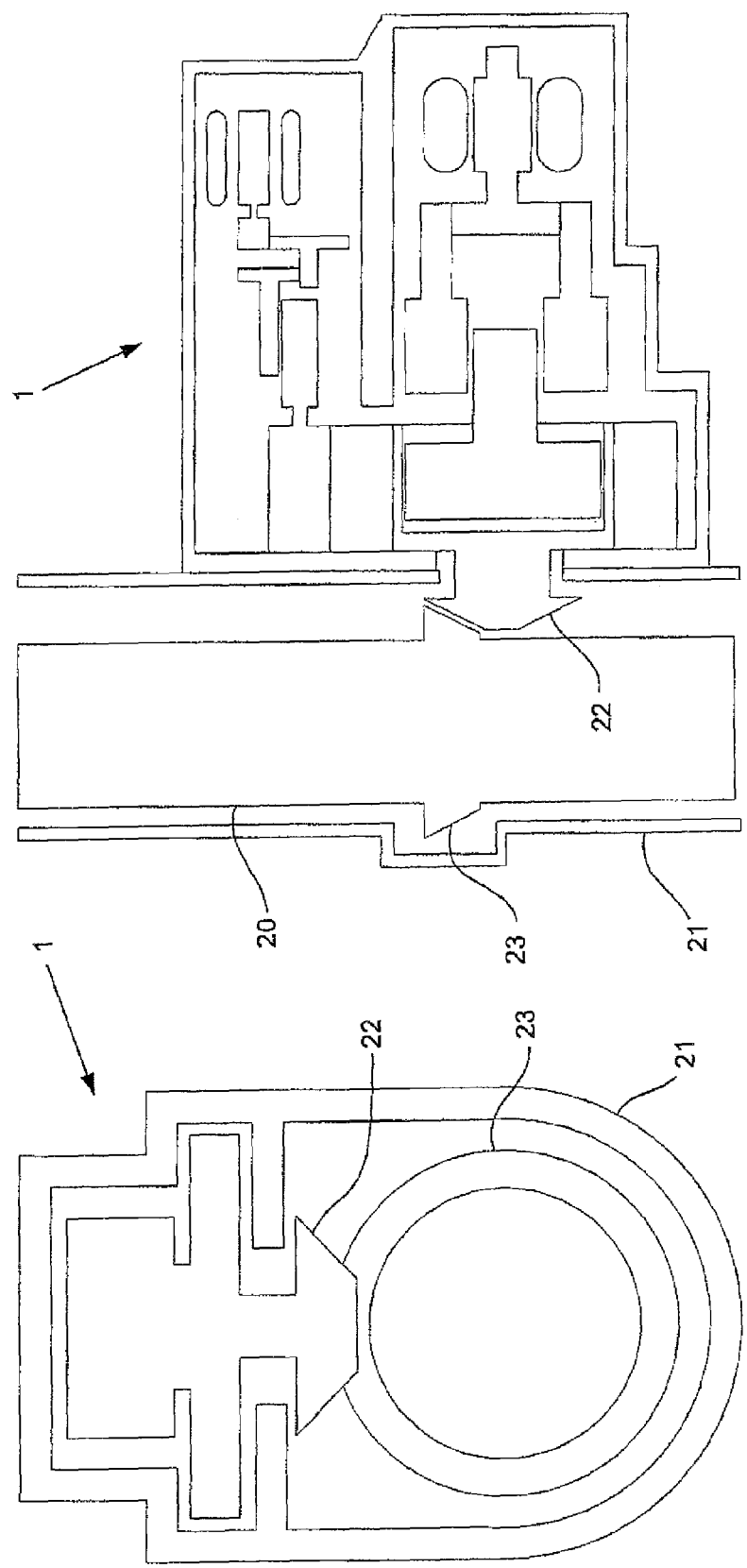

ACTUATOR

This application is the U.S. national phase of International Application No. PCT/GB2007/050532, filed 11 Sep. 2007, which designated the U.S. and claims priority to Great Britain Application No. 0618902.1, filed 25 Sep. 2006, the entire contents of each of which are hereby incorporated by reference.

FIELD OF THE INVENTION

The present invention relates to an actuator with two motors driving a common output member.

BACKGROUND OF THE INVENTION

An actuator of this kind is described in US2005/0229729. The motors are coupled to the output member by a planetary differential reduction gear. The output member is driven by only one of the motors, should the other motor break down. The actuator is used to lock the undercarriage of an aircraft in a retracted position.

SUMMARY OF THE INVENTION

A first aspect of the invention provides an actuator comprising:
- a high rate drive path including a first motor and a high rate gearbox;
- a high torque drive path including a second motor and a high torque gearbox;
- an output member; and
- a harmonic gear comprising:
  - an elliptical wave generator component;
  - a flexible spline component which is coupled to the wave generator by a bearing and flexes to conform to the elliptical shape of the wave generator; and
  - a circular spline component which surrounds and meshes with the flexible spline component;

wherein one of the harmonic gear components is coupled to the output member, and each of the other harmonic gear components forms part of a respective one of the drive paths.

The actuator can typically continue to operate in a number of failure conditions including failure of one of the motors, jamming of a drive path between one of the motors and the output member, and jamming of the harmonic gear. The harmonic gear provides various advantages compared with planetary gears including: high gearing ratio combined with a low weight; compact size, particularly in the axial direction; low backlash; and low moment of inertia.

Any one of the components of the harmonic gear may be coupled to the output member, but in the preferred embodiment described below the flexible spline component is coupled to the output member.

The actuator may further comprise two brakes, each configured to apply a braking force to a respective one of the harmonic gear components, either by engaging the component or by engaging an element in the drive path associated with that harmonic gear component. This enables the actuator to be operated in a mode in which one of the motors is supplying power (or is shorted so as to generate a damping force) and the other is locked by the brake.

Typically the first motor and the second motor of the actuator are dissimilar.

Typically the gear ratio between the output member and the first motors is different to the gear ratio between the output member and the second motors. This enables dissimilar motors to be used, which are less likely to fail at the same time than similar motors.

A second aspect of the invention provides a method of operating the actuator of the first aspect of the invention, the method comprising simultaneously driving the motors.

The motors may apply power in opposite senses to the output member, and/or in the same sense. As well as operating the actuator in a mode in which the motors are driven simultaneously; the actuator may be operated in:
- a further mode in which at least one of the motors is back driven by its respective harmonic gear component;
- a further mode in which one of the motors is shorted so as to generate a damping force; and/or
- a further mode in which at least one of the harmonic gear components is locked.

An aircraft may incorporate such an actuator for deploying or steering a landing gear, or deploying an aerodynamic control surface such as a flap or aileron.

A further aspect of the invention provides an aircraft landing gear comprising one or more wheels, and an actuator according to the first aspect of the invention having its output member coupled to the wheel(s) such that movement of the output member causes the wheel(s) to be steered.

BRIEF DESCRIPTION OF THE DRAWINGS

Embodiments of the invention will now be described with reference to the accompanying drawings, in which:

FIG. 2 is a horizontal cross section through a landing gear steering mechanism;

FIG. 3 is a vertical cross section through a landing gear steering mechanism;

DETAILED DESCRIPTION OF EMBODIMENT(S)

Figure 1:
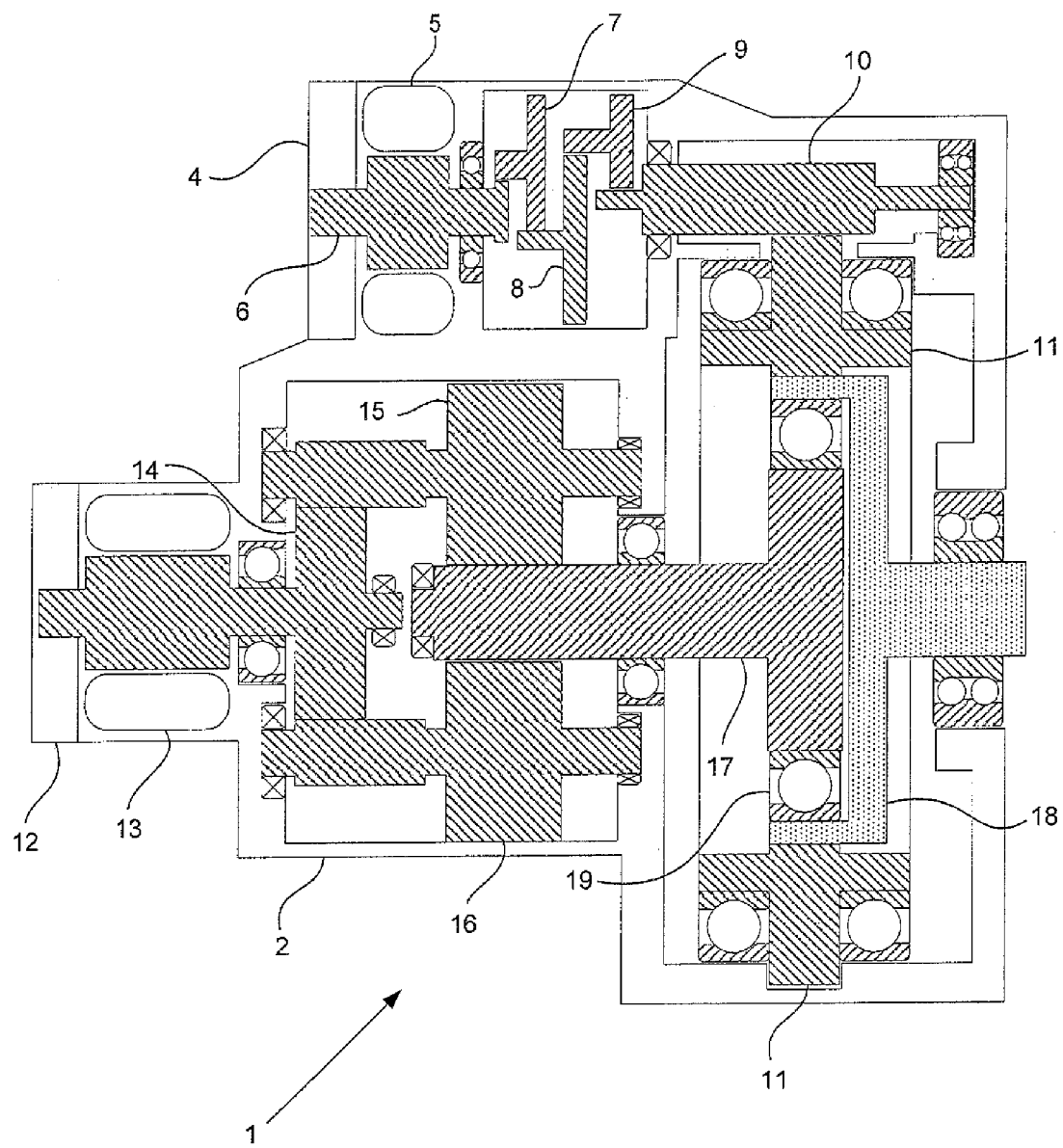
FIG. 1 is a cross section through a harmonic gear actuator.

Referring to FIG. 1, an actuator 1 is shown. The actuator comprises a housing 2, and comprises a high rate drive path and a high torque drive path each coupled to a common output member. The high rate drive path comprises a brake 4, an electric motor 5, a high rate gearbox comprising a set of five interlocking gears 6-10 and a circular spline 11. The high torque drive path comprises a brake 12, an electric motor 13, a high torque gearbox comprising three gears 14-16, and a wave generator 17.

The high rate drive path and high torque drive path operate in parallel, and both couple to a flexspline 18 with a shaft protruding from the housing which acts as the output member of the actuator. When the two drive paths are driven to deliver the same mechanical power, the motor 5 in the high rate path rotates at a significantly greater speed than the motor 13 in the high torque path. For example the gear ratio of the high rate path may be 1600:1 and the gear ratio of the high torque path may be 53:1. In other words, a single turn of the output member is made for every 1600 turns of the high rate motor 5 and every 53 turns of the high torque motor 13.

Although not apparent from FIG. 1, the wave generator 17 is elliptical in profile. The flexspline 18 surrounds the wave generator and is coupled to it by an interface bearing 19. The flexspline 18 is formed from a flexible material so that it conforms to the elliptical shape of the wave generator 17. The flexspline 18 has a number of teeth on its outer periphery which engage with teeth on the inner periphery of the annular circular spline 11. The flexspline 18 has two fewer teeth than the circular spline. Thus for every clockwise turn of the wave generator 17 the flexspline rotates anticlockwise by two teeth, thus providing a high gearing ratio R. The ratio R is determined by the number of teeth carried by one half of the circular spline 11. The ratio R is typically between 30 and 160.

In a conventional harmonic gear, the circular spline is fixed. By contrast, in the actuator 1, the circular spline 11 instead forms part of the high rate drive path. In an example actuator design exercise, components that might be typically selected are shown below in Table 1.

TABLE 1

| Component | Supplier | Part Number | Mass Estimate (kg) |
|---|---|---|---|
| motor 5 | Kollmorgen | 01812 | 0.8 |
| motor 13 | Kollmorgen | 01513 | 0.5 |
| brake 4 | Intorque | BFK457-6 | 1.1 |
| brake 12 | Intorque | BFK457-6 | 1.1 |
| gearbox 6-10 | HDS | CSF Series | 1.7 (+0.2) |
| gearbox 14-16 | Neugart | PLE 60 | 1.1 |
| harmonic drive | HDS | CSF Series | 12.4 |
| Housing, bearings & Resolvers | | | 9.1 |

Note that the total weight of the actuator, based on the above estimates, is 28 kg.

The actuator 1 may be implemented in a number of places on an aircraft, or in non-aircraft applications. For instance, the actuator may be used to a control surface of a wing, such as an aileron. In the example described below with reference to FIGS. 2 to 6, the actuator 1 is used to apply steering torque to a nose landing gear leg pinion.

Referring to FIGS. 2 and 3, a nose landing gear leg pinion 20 is rotatably housed in a strut 21 which extends downwardly from an aircraft nose (not shown).

A bevel gear 22 on the output shaft extending from the flexspline 18 meshes with a bevel gear 23 on the pinion 20. Thus as the flexspline 18 rotates, the pinion 20 is rotated about its axis in order to steer the wheels of the nose landing gear. The bevel gears 22, 23 provide a final reduction ratio of 2:1.

Figure 4:
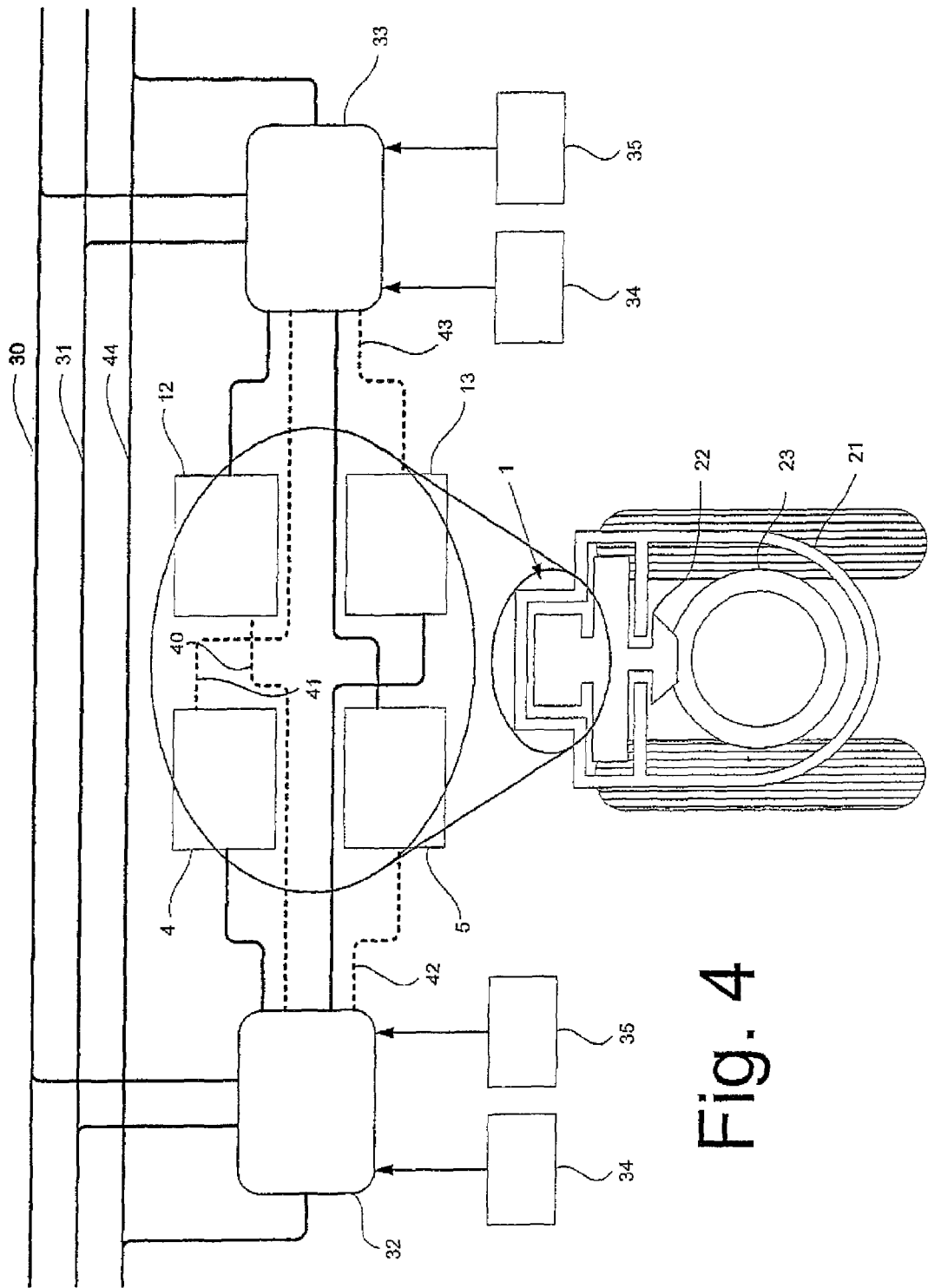
FIG. 4 is a schematic view of the electronic control system for the steering mechanism.

The electrical interface of the system is shown in FIG. 4. The electrical interface is driven by two high voltage DC busses 30, 31 notionally operating at 270V. A pair of electronic steering controls 32, 33 are coupled to the DC busses 30, 31 and house the necessary power bridge arrangement to drive the electric motors 5, 13, which are three-phase devices. Each steering control 32, 33 receives input from hand wheels 34 and rudder pedals 35. Each steering control also has control lines connected to the brakes 4, 12, and motors 5, 13. On power up, all components are controlled by one channel only—that is by the steering control 32 or by the steering control 33. In an alternative case, each steering control 32, 33 may be responsible for only one brake and one motor. In this case, further weight saving could be made on the landing gear by removing the brake control lines 40, 41 and motor control lines 42, 43.

The operational behaviour of the actuator 1 is described below in Table 2. In Table 2 the following key is applied to the sense of applied power in the two drive paths:

Open: The drive path is open circuit, and free to be back-driven.
Locked: The drive path is mechanically locked.
Plugged: The motor within the drive path is shorted across its phases and generates a mechanical damping force that opposes motion at a rate approximately proportional to rotational speed.
1: The sense of the applied torque/rate is positive.
−1: The sense of the applied torque/rate is negative.

TABLE 2

| High Rate Path | High Torque Path | Normal Operation Mode | Equivalent Failure Mode |
|---|---|---|---|
| Open | Open | Inactive/Inactive mode | Total loss of power. |
| Locked | Open | Inactive/Brake mode | Loss of power to high torque path |
| Open | Locked | Brake/Inactive mode | Loss of power to high rate path |
| Plugged | Locked | Plugging/Brake mode | |
| Locked | Plugged | Brake/Plugging mode | |
| 1 | 1 | High rate mode | Jam within harmonic gear |
| 1 | −1 | High torque mode | |
| Locked | 1 | High rate path brake mode | Jam within high rate path |
| 1 | Locked | High torque path brake mode | Jam within high torque path |
| Locked | Locked | Brake/Brake mode | |

Thus during normal operation the actuator can be switched between any one of the operation modes shown in Table 2 by selectively applying the brakes and/or switching the motors between the various states. In the event of a jam or power failure, the actuator operates in an equivalent failure mode.

Inactive/Inactive Mode

In this mode the actuator output is fully back-driveable. The equivalent failure mode applies when both DC busses have failed, or the supply cables are cut. The system is back-drivable in this mode. This mode may be used when the aircraft is being towed on the ground.

Inactive/Brake (Brake/Inactive)

In these two modes the actuator output is fully back-driveable. The equivalent failure mode applies when a mechanical jam has occurred in the braked channel. There is inertial damping in the inactive free path.

Plugging/Brake (Brake/Plugging) Modes

In these two modes, the free motor is shorted and provides a damping force as a function of rate. Each motor may be provided with a sink such as a power resistor (not shown) to absorb regenerated power in these modes. Either one of these modes may be used on landing of the aircraft to provided so-called "shimmy damping". In the equivalent failure mode, a mechanical jam has occurred in the braked channel. A further plugging/plugging mode (not shown in Table 2) may also be used as an alternative mode for shimmy damping.

High Rate Mode

In this mode, the harmonic gear is used as a 1:1 gearbox—in other words the circular spline 11 and wave generator 17 rotate together. There is no risk of force fight. The equivalent failure mode is a jamming failure within the harmonic gear. In this failure mode the system maintains its ability to impart torque directly from the two input motors. However, in this failure mode the two gearboxes are constrained to rotate with one another and torsional mismatch between the gearboxes may result in fighting and thermal and electrical loading.

High Torque Mode

In this mode the sign of the applied power for the two driving paths is opposite, and the differential gear ratio is in use. There is no equivalent failure mode.

High Rate Path Brake Mode

In this mode the full differential gear ratio is in use. The actuator shall perform at a reduced rate, but through judicious selection of gear ratios, the actuator should maintain 100% output torque availability. In the equivalent failure mode, a jam is present in the high rate path.

High Torque Path Brake Mode

In this mode the full differential gear ratio is in use. The actuator shall perform at a reduced rate, but through judicious selection of gear ratios, the actuator should maintain 100% output torque availability. In the equivalent failure mode, a jam is present in the high torque path.

Brake/Brake Mode

In the embodiment described, modestly sized brakes shall be sufficient to ensure that the system cannot be back-driven.

The high rate components (namely the motor 5, gearbox 6-10 and brake 4) must be capable of supporting full load torque, because they are in parallel with the high torque path. This prevents the high rate components from being overhauled by the high torque components when operating under large loads.

The actuator 1 shown in FIG. 1 uses the flexspline 18 as the output member. The gear ratio when the high rate path (containing the circular spline 11) is locked is thus –R. Similarly, the gear ratio when the high torque path (containing the wave generator 17) is locked is R/R+1.

If the actuator is back driven (in which case the flexspline 18 becomes the input member), then the gear ratios are –1/R when the circular spline 11 is locked and (R+1)/R when the wave generator 17 is locked.

In an alternative gearbox arrangement (not shown), a brake may be provided to lock the flexspline 18. This provides two further possibilities:

with the circular spline 11 as input and the wave-generator 17 as output, the gear ratio is 1/R+1; and with the wave generator 17 as input and the circular spline 11 as output, the gear ratio is R+1.

The brakes 4, 12 are sized so that their respective motors 5, 13 may drive through them in case of failure.

Note that both of the gearboxes are back-driveable.

In a reversionary or failed mode, the actuator should typically provide full torque capability within a given application, but often a reduction in achievable rate could be accepted.

Figure 5:
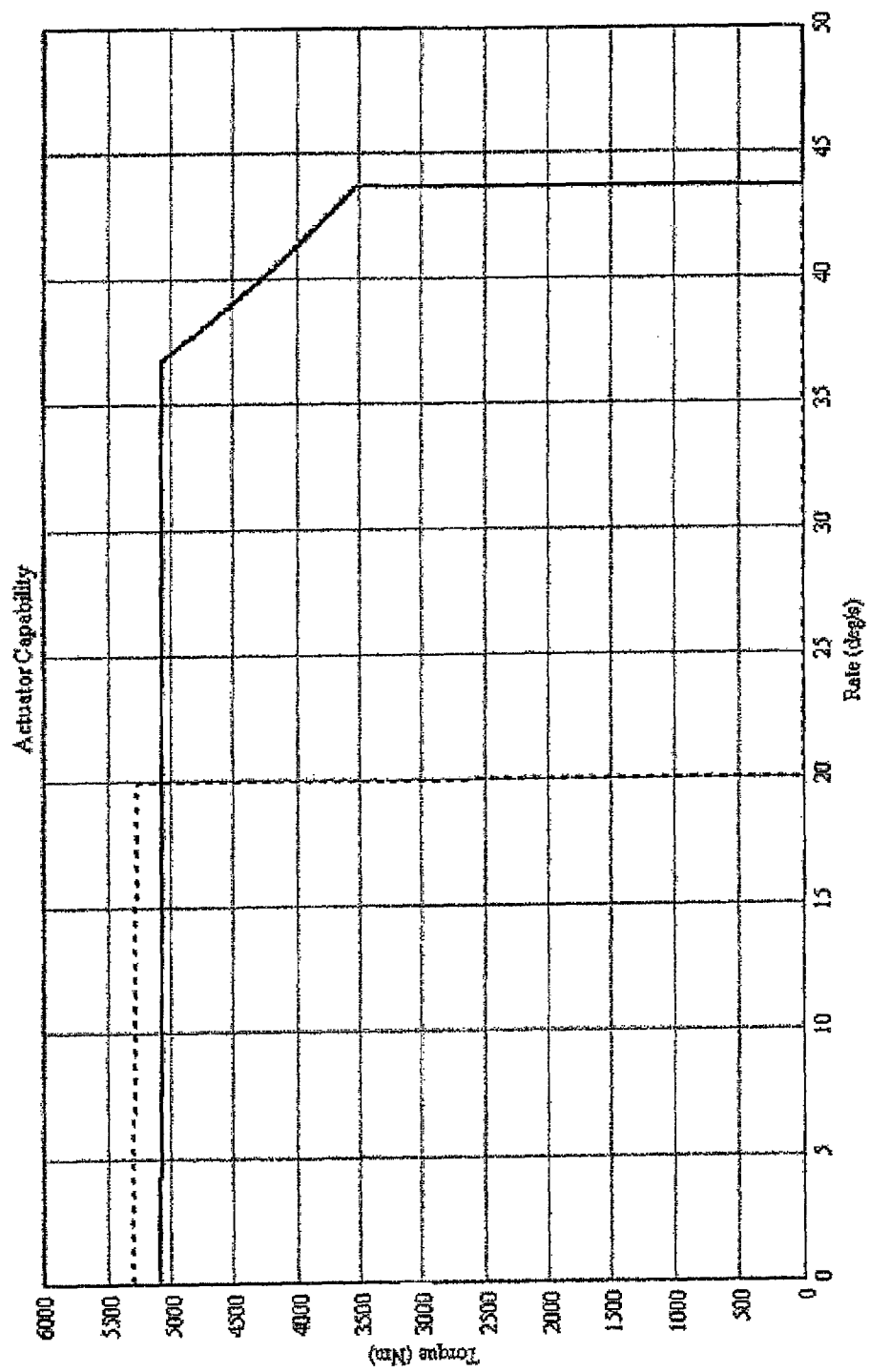
FIG. 5 is a graph showing maximum torque ratings for the two drive paths when driven by 270V DC busses.

Load rate capabilities of the two actuator load paths are shown in FIG. 5. (FIG. 5 illustrates the capability prior to the further 2:1 bevel gear reduction ratio at the output). Depending on supply voltages, the motor rates may have to be artificially limited, as the gearbox and brake components will have an upper physical limit to their allowable angular velocity.

Note that the harmonic gear acts as a differential and therefore all loads and rates enveloped by the high rate path capability may effectively be achieved through a combination of inputs from the two load paths.

Figure 6:
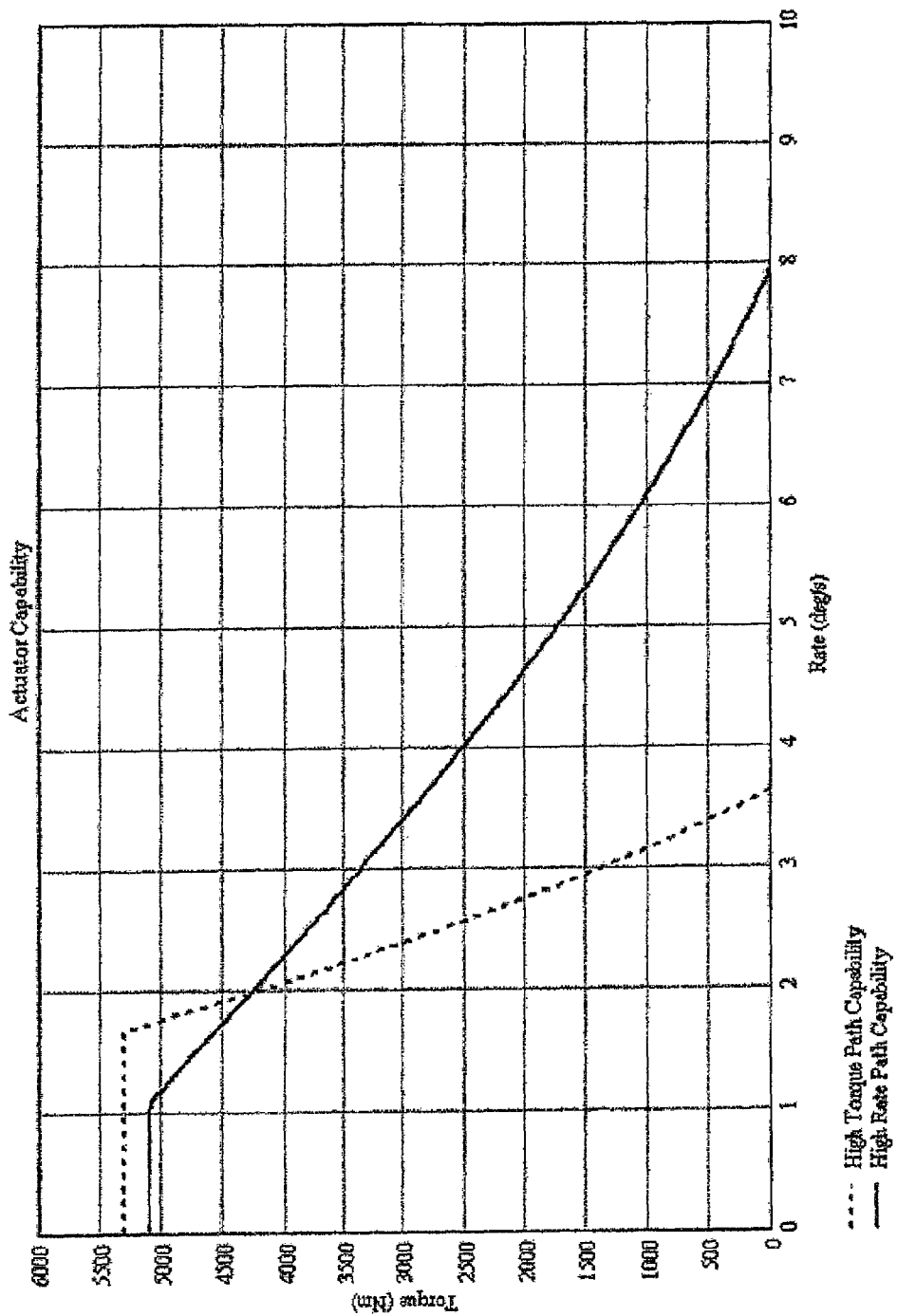
FIG. 6 is a graph showing maximum torque ratings for the two drive paths when driven by an emergency 28V DC bus.

A 28V emergency bus 44 may be provided to operate the actuator 1 in the event of failure of both of the high voltage DC busses 30, 31. It is assumed that during operation of the emergency bus, that a significantly reduced performance shall be acceptable. FIG. 6 illustrates the load path load at rate capability during operation at a nominal 28V. The system will be capable of achieving the peak torque condition at rates up to 0.9 deg/s, and an unloaded peak rate of 4 deg/s. Damping and free castor modes would still be fully available.

Under normal steering conditions, the two motors will be driven simultaneously according to a control law, at some point between the extreme cases of the high rate mode and the high torque mode. The control law would under normal conditions operate under a defined optimal performance measure. For instance, the system might be controlled to minimise motor or supply current draw by control of the power input by each motor.

The brakes 4, 12 may be replaced by bi-stable devices.

There is also opportunity for damping: braking the high rate motor 5 and shorting or plugging the high torque motor 13, leading to massive mechanical advantage at the high rate motor 5. Preliminary estimates suggest that a damping rate of 80 kNms/rad could be generated (assuming zero magnetic slip). This is thought to be more than sufficient for the majority of damping requirements.

A lightweight, failure tolerant, electro-mechanical actuator concept has been presented which typically has the following design advantages:

1. Very high power to weight ratio.
2. Full mechanical redundancy and jam tolerance.
3. No dormant failure modes.
4. Dissimilar primary drive paths (the motors and gearboxes could be of different type, but certainly of differing size).
5. Actuator force fighting impossible under normal conditions.
6. Very low brake mass overhead.
7. Continuously variable and very wide torque/rate characteristic.
8. Probability of damage due to back drive condition reduced.
9. Freely back-driveable in the normal mode (no additional components added for this function).
10. Fail to trail implicit within design after first failure.
11. Electrical system redundancy, with scope for triplex or quadruplex architecture.
12. Scope for flexibility within the supporting aircraft architecture.
13. Very high damping capability.
14. Operation under wide range of operational voltages.

Although the invention has been described above with reference to one or more preferred embodiments, it will be appreciated that various changes or modifications may be made without departing from the scope of the invention as defined in the appended claims.

The invention claimed is:

1. An actuator comprising:
   two motors, each of said motors having a drive path;
   an output member; and
   a harmonic gear comprising:
      an elliptical wave generator component;
      a flexible spline component which is coupled to the wave generator component by a bearing and flexes to conform to the elliptical shape of the wave generator component; and
      a circular spline component which surrounds and meshes with the flexible spline component, wherein one of the harmonic gear components is coupled to the output member, and each of the other harmonic gear components is coupled to a respective one of the two drive paths, wherein said two motors are dissimilar.

2. The actuator of claim 1 wherein the flexible spline component is coupled to the output member.

3. The actuator of claim 1 further comprising two brakes, each brake configured to apply a braking force to a respective one of the harmonic gear components.

4. The actuator of claim 1 further comprising respective gears coupling each drive motor to a respective harmonic component.

5. The actuator of claim 1 wherein the gear ratio between the output member and the first motor is different to the gear ratio between the output member and the second motor.

6. A method of operating the actuator of claim 1, the method comprising simultaneously driving the motors.

7. The method of claim 6 comprising driving the motors so as to apply power in opposite senses to the output member.

8. The method of claim 6 comprising:
  operating the actuator in a mode in which the motors are driven simultaneously; and
  operating the actuator in a further mode in which at least one of the motors is back driven by its respective harmonic gear component.

9. The method of claim 6, comprising:
  operating the actuator in a mode in which the motors are driven simultaneously; and
  operating the actuator in a further mode in which one of the motors is shorted so as to generate a damping force.

10. The method of claim 6 comprising:
  operating the actuator in a mode in which the motors are driven simultaneously; and
  operating the actuator in a further mode in which at least one of the harmonic gear components is locked.

11. The method of claim 6 wherein the output member is coupled to a component of an aircraft.

12. An aircraft comprising an actuator according to claim 1.

13. An aircraft landing gear comprising at least one wheel, and an actuator according to claim 1 having its output member coupled to the at least one wheel and said landing gear and actuator configured so the output member causes the at least one wheel to be steered.

* * * * *